E. SEAVEY.
DRILL GAGE PLATE.
APPLICATION FILED OCT. 23, 1909.
973,078.
Patented Oct. 18, 1910.
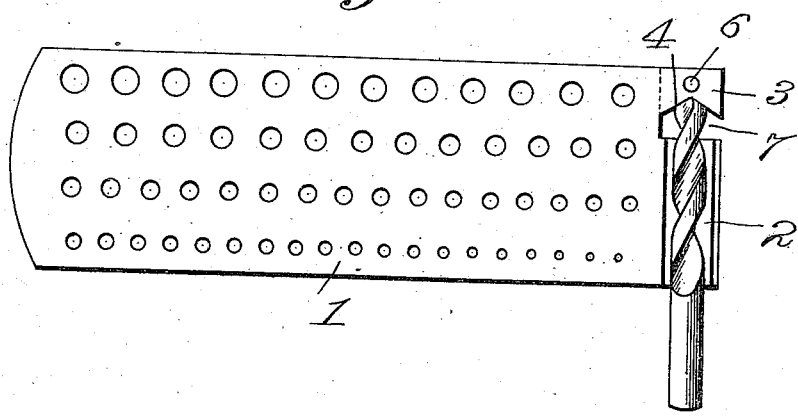
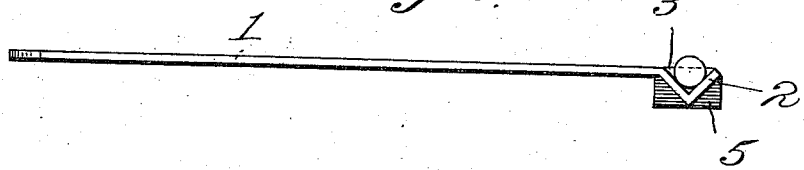
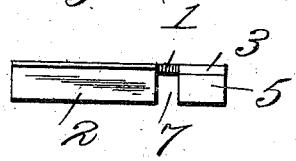
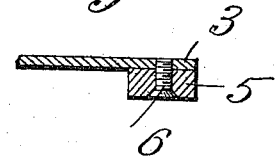
Witnesses:
H. H. Knight
Ray T. Ernst
Inventor
Eugene Seavey
By his Attorneys

UNITED STATES PATENT OFFICE.

EUGENE SEAVEY, OF NEW YORK, N. Y.

DRILL GAGE-PLATE.

973,078. Specification of Letters Patent. Patented Oct. 18, 1910.

Application filed October 23, 1909. Serial No. 524,176.

To all whom it may concern:

Be it known that I, EUGENE SEAVEY, a citizen of the United States of America, and a resident of Manhattan, city, county, and State of New York, have invented certain new and useful Improvements in Drill Gage-Plates, of which the following is a specification.

The object of this invention is to provide a simple and effective gage plate to aid mechanics in grinding twist-drills. By reason of its peculiar construction, this gage plate can be readily applied to the drills and furthermore provides, in convenient position, the usual graduated holes for gaging the diameters of drills. This gage plate can be applied to any size of drill and insures perfect beveling and centering of the point of the drill.

Referring now to the drawings, Figure 1 is a plan view of my improved drill gage plate, Fig. 2 is a side elevation, Fig. 3 is an end view, and Fig. 4 is a sectional view of a detail.

In the drawings like reference numerals refer to like parts in all the figures.

Referring more particularly to the drawings, 1 represents a gage plate containing a series of graduated holes for gaging diameters of drills. One end of said gage plate has an extension which is divided transversely by the angular sight notch 7 into two portions of which 2 is struck out transversely from the body of the gage plate 1, in the form of a right angled trough for receiving and holding the drill at one end transversely of the gage plate; and 3 is an abutment located in the same plane as the gage plate. One edge of said abutment has the angle 4 which is adapted to receive the tip of a drill being gaged. The angle 4 may be of any degree, and will be determined by the character of the work which the drills gaged thereby are required to perform.

For using the device a drill is set in the trough 2 and its edge sighted across the angular sight notch against the angle 4 to determine the correctness of its bevel while being sharpened.

The abutment 3 being merely of the thickness of the gage plate 1, it is apparent that drills of the smallest diameter lying in the trough 2, will escape the angle 4. To obviate this I fasten the thickening block 5 by means of the screw 6, to the under side of the abutment 3, as is clearly shown in Fig. 4. The thickening block 5 has an angle corresponding to the angle 4 and its depth is at least that of the trough 2.

Having described my invention, what I claim as new and desire to secure by Letters Patent is:

1. A drill gage plate having at one end an extension divided transversely into two portions so as to provide an angular sight notch; one portion being struck out into the form of a right angle transverse trough for receiving and holding the drill to be gaged and the other portion forming an abutment having an angle adapted to receive the tip of the drill.

2. A drill gage plate having at one end an extension divided transversely into two portions so as to provide an angular sight notch; one portion being struck out into the form of a right angle transverse trough for receiving and holding the drill to be gaged and the other portion forming an abutment having an angle adapted to receive the tip of the drill and a thickening block secured to the underside of the abutment.

EUGENE SEAVEY.

Witnesses:
WM. E. KNIGHT,
LAURA E. MONK.